United States Patent [19]
Stippich

[11] 3,795,354
[45] Mar. 5, 1974

[54] LUGGAGE ATTACHMENT FOR TANDEM-WHEELED VEHICLE

[76] Inventor: Garold L. Stippich, 6008 Moeller Rd. Lot No. 278, FT. Wayne, Ind. 46806

[22] Filed: Feb. 28, 1972

[21] Appl. No.: 229,850

[52] U.S. Cl. .............................. 224/32 A, 224/32 R
[51] Int. Cl. .............................................. B62j 9/00
[58] Field of Search ......................... 224/32 A, 32 R

[56] References Cited
FOREIGN PATENTS OR APPLICATIONS

| | | | |
|---|---|---|---|
| 22,208 | 9/1912 | Great Britain | 224/39 R |
| 692,772 | 3/1930 | France | 224/32 A |
| 779,785 | 1/1935 | France | 224/39 R |

*Primary Examiner*—Robert G. Sheridan
*Assistant Examiner*—Kenneth Noland

[57] ABSTRACT

For use on a tandem-wheeled vehicle which includes an open frame having forward and rear ends a luggage attachment comprising a carrier frame having front and rear ends and first and second socket means for slidably coupling the front and rear ends, respectively, of the carrier frame to the vehicle frame. The rear socket means includes a pair of slidably engageable socket elements and means are provided for locking the socket elements against separation.

15 Claims, 7 Drawing Figures

LUGGAGE ATTACHMENT FOR TANDEM-WHEELED VEHICLE

BACKGROUND OF THE INVENTION

1. Field of the Invention

The present invention relates to a luggage attachment for a tandem-wheeled motor vehicle such as a motorcycle or the like and in particular to such an attachment which is removably mounted on the vehicle and secured with a locking device.

2. DESCRIPTION OF THE PRIOR ART

Motorcycles, bicycles, and similar types of tandem-wheeled vehicles are characterized by having an open supporting frame and typically do not include any provision for storing or carrying articles thereon. Consequently, such vehicles frequently have saddlebags or similar type luggage cases installed thereon. In one such type of saddlebag attachment, a plurality of flexible belts or straps are used to secure the saddlebags to the vehicle frame. In another type of luggage attachment, saddlebags are provided with a supporting frame which is semipermanently bolted to the vehicle frame with brackets and threaded fasteners. In these, and all other forms of saddlebag attachments for tandem-wheeled vehicles known to the present inventor, attaching and removing the saddlebags to and from the vehicle requires a substantial amount of manual effort. Such luggage attachments also tend to interfere with seating of a second passenger on the vehicle and add bulk to the vehicle which is of no value except when the saddlebags are actually in use. Further, these prior art luggage attachments while not conveniently removable, can be removed with ordinary tools and do not include any means for locking the saddlebags to the vehicle such that they cannot be removed by unauthorized people.

SUMMARY OF THE INVENTION

The invention in its broader aspects is a luggage attachment for use on a tandem-wheeled vehicle which has an exposed frame and comprises a carrier frame having front and rear ends, first means for slidably coupling the front end of the carrier frame to the vehicle frame and second means for slidably coupling the rear end of the carrier frame to the vehicle frame, and means for selectively locking and unlocking the second coupling means whereby the carrier frame cannot be separated from the vehicle frame.

In one specific embodiment of the invention, the first coupling means includes first and second slidably engageable socket elements fixedly secured to one and the other of the front end of the carrier frame and the vehicle frame, respectively. The second coupling means includes third and fourth slidably engageable socket elements fixedly secured to one and the other of the rear end of the carrier frame and the vehicle frame, respectively, the locking means securing the third and fourth socket elements against relative movement.

In yet another specific embodiment of the invention, the first and third of the aforementioned socket elements are slidably received into the second and fourth socket elements in a direction horizontally and forwardly with respect to the vehicle frame, the first and third socket elements being supported vertically by the second and fourth socket elements, respectively.

It is therefore an object of the invention to provide a luggage carrier attachment for use with a tandem-wheeled vehicle which can be easily attached and detached therefrom.

It is another object of the invention to provide such an attachment which is slidably mounted to the vehicle frame.

It is yet another object of the invention to provide such an attachment which can be securely locked to the vehicle whereby it cannot be removed by unauthorized persons.

It is still another object of the invention to provide such an attachment which enhances the appearance of the vehicle.

Still another object of the invention is to provide such an attachment which includes saddlebags individually detachably secured thereto.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein.

DESCRIPTION OF THE PREFERRED EMBODIMENT

Figure 1:
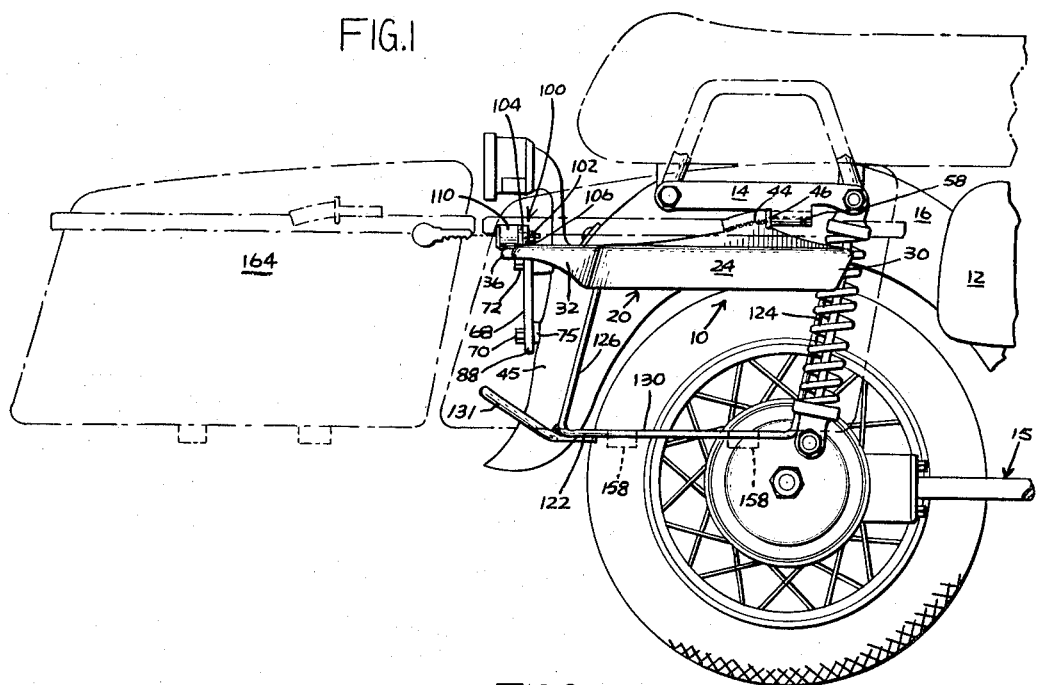
FIG. 1 is a side-plan view of the luggage attachment shown installed on the rear portion of a tandem-wheeled vehicle, the vehicle being shown in fragmentary plan view.

Referring now to the drawings there is shown generally at 10 a luggage attachment which is attached to the rear portion of an openframed, tandem-wheeled vehicle 12 such as a motorcycle, minibike, bicycle, or the like. Vehicle 12 is characterized by having an open frame 15, that is, a frame which is not enclosed within a body. The vehicle frame 15 typically includes seat supporting members 14, rear fenders or mud guards 16 and other attendant supporting structure which has not been shown for clarity.

Figure 5:
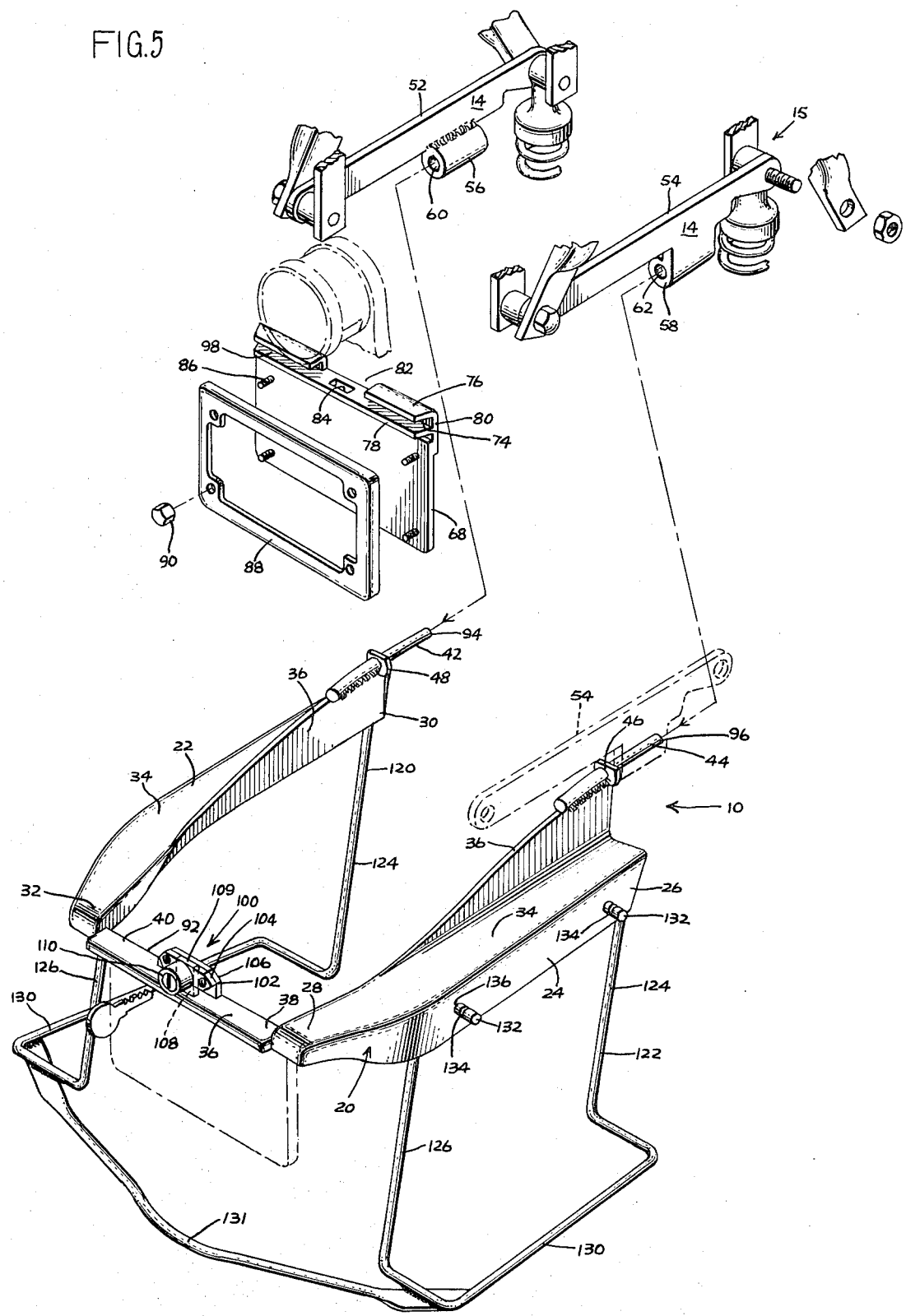
FIG. 5 is an exploded, perspective view shown in relation to associated portions of the vehicle frame.
Figure 6:
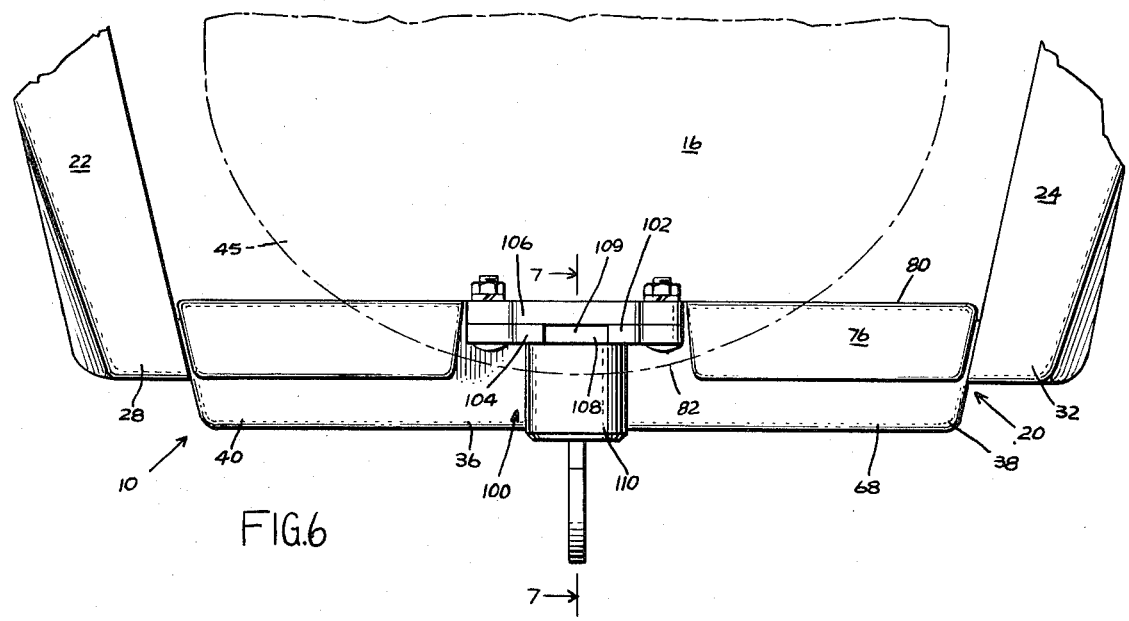
FIG. 6 is a fragmentary top-plan view of the rear portion of the luggage attachment showing details of the locking means.

As best seen in FIG. 5, attachment 10 comprises a carrier frame 20 including laterally spaced-apart, longitudinally extending frame members 22 and 24 having forward and rear ends 26, 28 and 30, 32, respectively. Longitudinal members 22, 24 are formed of suitable sheet material such as sheet steel which is formed by conventional forming techniques such as stamping or vacuum forming. The formed member 22, 24 each have a generally right angular body portion as at 34 (FIG. 5 only) and a vertically upwardly extending flange portion as at 37. Preferably, members 22, 24 are curved and rounded as shown to eliminate sharp corners and whereby the members blend with the lines of the vehicle with which the attachment 10 is to be used.

Extending laterally between the rear ends 28, 32 of members 22, 24 is an elongated, rectangular member 36 having opposite ends 38, 40, which are fixedly secured to the ends 28, 32 of members 22, 24 as by welding or with suitable threaded fasteners (not shown).

Figure 2:
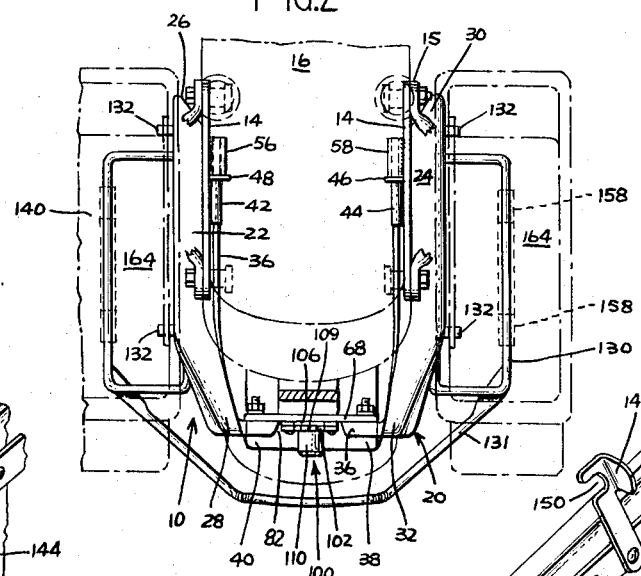
FIG. 2 is a top-plan view of the luggage attachment.

Secured as by welding to the upper edges of flange portions 37 adjacent forward ends 26, 30 of members 22, 24, are a pair of attaching elements or forwardly extending pins 42, 44. Pins 42, 44, are fitted with suitable insertion limiting washers 46, 48, respectively. As best seen in FIG. 2, rectangular element 36 secures longitudinal carrier frame elements 22, 24 together in laterally spaced-apart relationship such that the frame members 22, 24, straddle the rear portion of the vehicle frame 15 including the seat supports 14 and mud guards 16 thereof. Fixedly secured to seat support members 14 are a pair of attaching elements or hollow cylindrical female socket elements 56, 58, these elements 56, 58 being secured as by welding. Each element 56, 58 is provided with a hollow bore 60, 62, respectively, which extends parallel to the longitudinal dimensions of the vehicle and which are adapted to slidingly receive pins 42, 44. It will be observed that, when pins 42, 44 are received in socket elements 56, 58, the former will be vertically supported by the latter.

Figure 7:
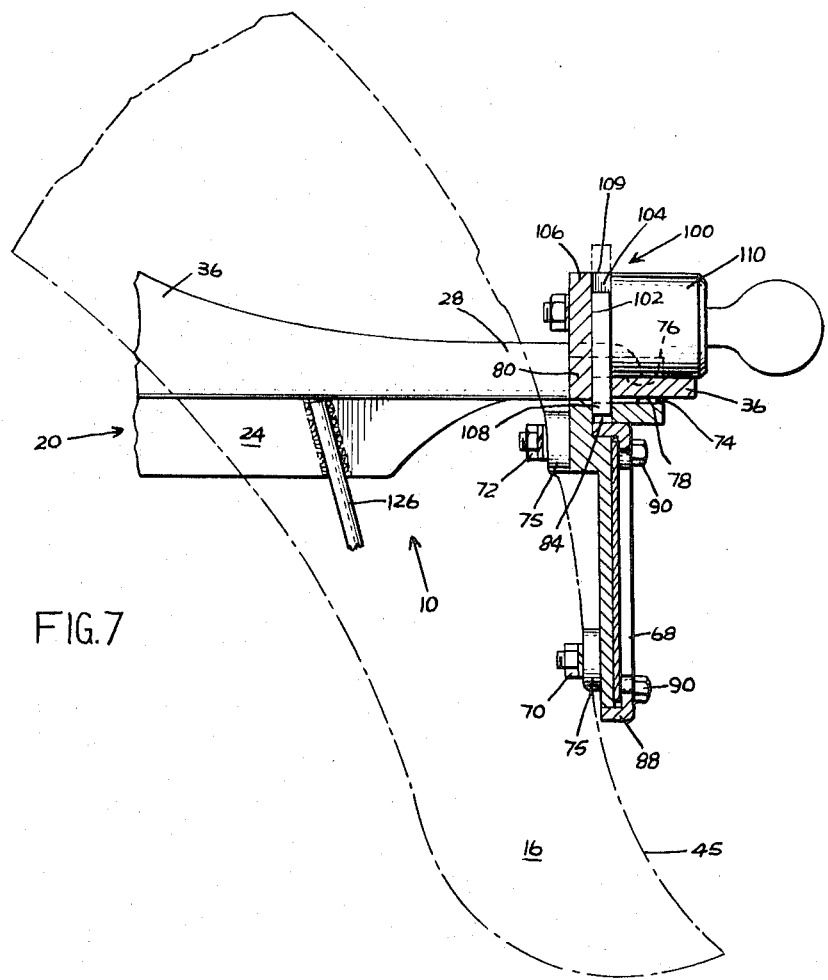
FIG. 7 is a sectional view of the locking means taken generally along line 7—7 of FIG. 6.

To the rearwardly disposed end 45 of fender 16 a plate member 68, which may be of die cast or extruded metal, is fixedly secured by means of suitable threaded fasteners 70, 72 and spacer elements 75 (FIG. 7 only). The upwardly disposed (as viewed in the drawings) side of plate 68 is formed with an elongated, laterally extending recess 74 having a generally rectangular cross section complementary to the cross section of rectangular member 36 whereby it will be apparent that the member 36 can be slidably received into recess 74 in a direction horizontally and forwardly with respect to the vehicle 12 the member 36 thereby constituting a pin-like projection which fits into recess 74 as a socket. It will be observed that the recess 74 is bounded by upper and lower defining walls 76, 78, respectively, and a forward wall 80. Portions of the upper and forward defining walls 76, 80, between the opposite ends thereof are cut away thereby defining a notch 82 as shown. A second recess 84 is formed through lower defining wall 78 such that second recess 84 communicates with notch 82.

Plate 68 preferably has perimetral dimensions similar to the peripheral dimensions of a conventional license plate (not shown) and is fitted with a plurality of mounting studs as at 86 (FIG. 5 only) and a license plate frame 88 removably received on studs 86 and secured with suitable threaded fasteners as at 90. It will now be apparent that rectangular member 36 and recess 74 function as third and fourth slidably engageable pin and socket elements, respectively.

To install the carrier frame 20 onto the vehicle 12, pin elements 42, 44 are aligned with the respective bores 60, 62 of complementary socket elements 56, 58 and rectangular member 36 is aligned with recess 74 and the carrier frame 20 slid horizontally forwardly with respect to the vehicle frame 16. In a specific embodiment of the invention, it has been found desirable to construct the carrier frame 20 such that the longitudinal spacing between the forward edge 92 of member 36 and the distal ends 94, 96 of pins 42, 44, respectively, is greater than the longitudinal spacing between the rearwardly disposed openings of bores 60, 62, and the open side 98 (FIG. 5 only) of recess 74 whereby, when the carrier frame 20 is installed on the vehicle 12, pins 42, 44, and member 36 will be received by the corresponding socket elements 56, 58 and 74 in sequence. By reason of this last-described structure, the need to simultaneously align both the front and rear pairs of socket elements is obviated thereby adding to the ease of installation of the carrier frame 20.

To fixedly secure the carrier frame 20 to the vehicle frame 14 there is provided a locking means or security lock 100. Locking means 100 comprises a bolt assembly 102 including a pair of flange members 104, 106 which are fixedly secured to member 36 in upstanding relationship thereto. Flanges 104, 106 have lateral dimensions such that bolt assembly 102 is slidably receivable in and engaged by the notch 82 in plate member 68. Bolt assembly 102 further includes a latch element 108 vertically slidably mounted in a recess 109 in flanges 104, 106 and which is movable between a retracted position in which the bolt 108 is flush with the bottom of flanges 104, 106, and an extended position in which the bolt 108 extends vertically downwardly from member 36. There is also provided a key operated tumbler assembly 110 which is operatively coupled to latch 108 to operate the latter in conventional manner. It will now be observed that when carrier frame 20 is in its installed position, bolt 108 may be moved to its extended position in which it is received in and lockingly engages recess 84 in plate member 68 thereby positively securing the carrier frame 20 against separation from the vehicle frame 14. While a key actuated tumbler assembly 110 has been illustrated, it will be apparent that other types of locking mechanisms may be utilized such as for example a combination lock.

To provide a means for securing saddlebags to the carrier frame 20 there are provided a pair of bent-wire frames 120, 122 which are secured to longitudinal frame members 22, 24, respectively. Each of the frames includes a pair of leg portions 124, 126 which depend vertically downwardly from points adjacent the forward and rear ends 26, 28, and 30, 32, of longitudinal frame members 22, 24, respectively. Frames 120, 122 have the lower portions thereof formed as by bending to form supporting portions 130 which, as can be seen from the drawings, extend laterally outwardly from and longitudinally between the distal ends of leg portions 124, 126. A suitable transverse brace 131 extends between the lower ends of leg portions 124, 126 and secured as by welding to add rigidity thereto. Brace 131 is curved as necessary to clear fender 16.

There are also provided a plurality of mounting studs 132 which extend laterally outwardly from longitudinal frame members 22, 24. Studs 132 may be formed as separate units which are fixedly secured to longitudinal frame members 22, 24, as by welding, or in the alternative, may be formed as integral parts of supporting frames 120, 122. In the latter case, suitable holes as at 136 are formed through the sides of longitudinal frame members 22, 24 and the ends of the supporting frames 120, 122, bent outwardly at an angle of 90° with respect to leg portions 124, 126 and passed outwardly through holes 136. Each of studs 132 is provided with a suitable annular groove as at 134 (FIG. 5 only).

Figure 3:
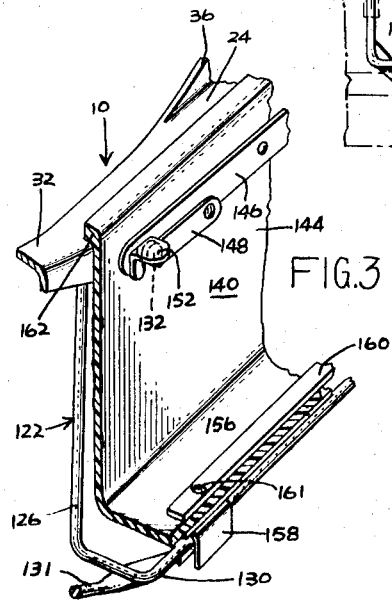
FIG. 3 is a fragmentary perspective view showing the saddlebag attaching means of the invention.
Figure 4:
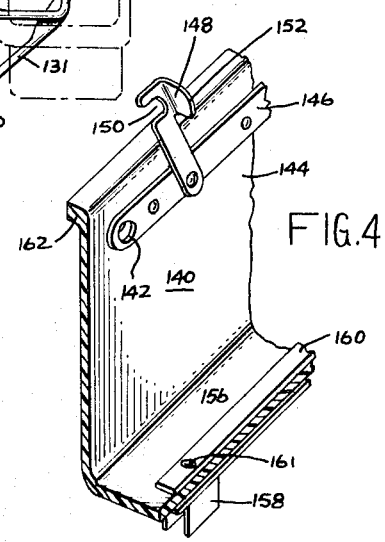
FIG. 4 is a fragmentary perspective view also showing details of the saddlebag attaching means.

Referring now specifically to FIGS. 3 and 4, saddlebags 140 are provided with suitable holes as at 142 (FIG. 4 only) which are spaced such that they are in registry with mounting studs 132 and dimensioned to slidably receive same therethrough. Secured to the inside of the inwardly disposed walls 144 of each saddlebag 140 is a first reinforcing plate 146 to which is mounted a plurality of latching plates as at 148. Each of the latching plates 148 is elongated and provided with a suitable notch 150 adjacent its distal end which is proportioned to be received in the annular recesses 136 of the studs 132. Each latch plate also includes an outwardly extending operating tab 152.

Secured to the bottom wall 156 of saddlebags 140 are a plurality of longitudinally spaced apart, inverted U-brackets 158 which, when the saddlebags 140 are in their installed position, receivably engage the longitudinally extending supporting portions 130, of bent-wire frames 120, 122. Preferably, suitable second reinforcing plates 160 are provided and U-brackets 158 secured thereto through the bottom wall of saddlebags 140 with rivets 161. As seen in FIGS. 3 and 4, it is preferable that the upper and inwardly disposed edges of these saddlebags 140 also be provided with a horizontally extending lip 162 which is adapted to be supportably positioned upon longitudinally extending frame members 22, 24. While not illustrated, it is preferable that the saddlebags 140 be of the type which are provided with a lockable cover 164.

The luggage attachment 10 as described is seen to provide a convenient and relatively inexpensive means for securing an article of luggage such as a saddlebag to a tandem-wheeled vehicle. By reason of the slidably engageable pin and socket elements thereof, the luggage attachment is simply and easily affixed to or removed from the vehicle. The luggage attachment includes locking means 100 whereby the luggage attachment can be secured against removal by unauthorized persons. Further, the saddlebags used in conjunction therewith, because their attaching means, i.e., latching plates 148, are mounted within the saddlebags themselves, and the saddlebags are provided with locks, can also be secured against unauthorized removal. Simultaneously, the saddlebags can be individually removed from the vehicle by unlocking the saddlebags and releasing the latching plates 148. In the alternative, the entire luggage attachment including the saddlebags can be removed as a unit when desired. The carrier frame itself integrates with the vehicle frame whereby it does not detract from the appearance thereof. The luggage attachment does not interfere with the seating of a second passenger on the vehicle.

While there have been described above the principles of this invention in connection with specific apparatus, it is to be clearly understood that this description is made only by way of example and not as a limitation to the scope of the invention.

What is claimed is:

1. A luggage carrier attachment for use on a tendem-wheeled vehicle which includes a vehicle frame having forward and rear ends comprising a carrier frame having front and rear ends, first means including first and second slidably engaged attaching elements fixedly secured to one and adapted to be fixedly secured to the other of said front end of said carrier frame and the vehicle frame, respectively, for removably coupling said front end of said carrier frame to said vehicle frame, second means including third and fourth slidably engageable attaching elements fixedly secured to one and adapted to be fixedly secured to the other of said carrier frame and said vehicle frame, respectively, for further removably coupling said carrier frame to said vehicle frame, said carrier frame including two laterally spaced-apart frame members adapted to straddle the rear portion of said vehicle frame, said third attaching element forming a a rigid part of said carrier frame and extending laterally between and operatively securing together said frame members, means for selectively locking and unlocking the engaged attaching elements together and from each other, respectively, said fourth element includes a support member having a first recess therein, said support member being adapted to be fixedly secured to said vehicle frame in a position with said recess extending laterally thereof, said third element including an elongated bar having a shape complementary to said recess, said third attaching element being slidably receivable in said recess in a direction horizontally and forwardly with respect to said vehicle frame and being supported vertically by recess in support member.

2. The attachment of claim 1 wherein an attaching element is secured to the forward end of each of said frame members, and an attaching element is adapted to be secured to each of the opposite sides of said vehicle frame, one of the engageable attaching elements being a pin and the other being a socket for receiving said pin.

3. The attachment of claim 1 wherein said locking means includes a second recess in said support member communicating with said first recess, a bolt element mounted on said third element for movement between a retracted position and an extended position wherein, when said third socket element is received in said fourth element said bolt is received in said second recess when in said extended position thereof thereby preventing separation of said third element from said fourth element.

4. The attachment of claim 3 wherein said support member further includes a notch therein communicating with said first recess, said bolt element including a bolt assembly slidably received in and engaging said notch when said third element is received in said fourth element.

5. The attachment of claim 3 wherein said locking means further includes a lock mechanism operatively coupled to said bolt element.

6. The attachment of claim 5 wherein said lock mechanism includes a key operable tumbler assembly.

7. The attachment of claim 1 wherein there are two of said first elements, each comprising an elongated pin, and two of said second elements, each including a socket element having a cylindrical bore extending parallel to the longitudinal dimension of said frame and proportioned to slidably receive said pins in a direction horizontally and forwardly with respect to said vehicle frame, said pins being supported in a vertical direction by engagement of said third and fourth elements.

8. The attachment of claim 7 wherein the longitudinal spacing between the frontwardly disposed ends of said first and third elements is greater than the longitudinal spacing between the open end of said recess and the receiving ends of said cylindrical bores, whereby, when said carrier frame is installed on said vehicle, said third and said first elements are received in said cylindrical bores and said first recess in sequence, respectively.

9. The attachment of claim 1 further comprising a saddlebag and means for supporting said saddlebag on said carrier frame.

10. The attachment of claim 9 wherein said supporting means includes a bent-wire frame secured to each of said carrier frame members, each of said wire frames including a pair of longitudinally spaced-apart leg portions fixedly secured to said carrier frame members, respectively, adjacent to opposite ends of the latter and depending downwardly therefrom, and a supporting portion extending laterally outwardly from and longitudinally between the lower extremities of said leg portions.

11. The attachment of claim 10 further comprising means for securing a saddlebag to said saddlebag supporting means, said securing means including a plurality of supporting pins fixedly secured to said carrier frame elements in longitudinally spaced-apart relationship and extending horizontally outwardly therefrom, there being an annular groove in each said supporting pin adjacent the distal end thereof, said saddle bag including a plurality of holes therein disposed in registry with and dimensioned to slidably receive said supporting pins, and a latch plate pivotably secured to said saddlebag adjacent each said hole for pivotable movement between engaged and disengaged positions, each said latch plate including a notch therein, said supporting pins being received in said notches and engaged by said latch plates when said plates are in said engaged positions.

12. The combination of claim 1 wherein said fourth element further includes means for securing a license plate thereto, said license plate securing means being formed as an integral part of said fourth element.

13. A luggage carrier attachment for use on a vehicle which includes a vehicle frame, comprising a carrier frame having front and rear portions, first means including two laterally spaced sets of first and second engageable attaching elements with each said first attaching element being fixedly secured to the front portion of said carrier frame and each said second attaching element being adapted to be operatively secured to said vehicle frame for removably coupling said front portion of said carrier frame to said vehicle, second means including third and fourth engageable attaching elements with said third attaching element being fixedly secured to said carrier frame and said fourth attaching element being adapted to be operatively secured to said vehicle frame further for removably coupling said carrier frame to said vehicle frame, said carrier frame including two laterally spaced frame members extending between the front and rear portions thereof which carry said two first attaching elements, respectively, said third attaching element forming a rigid part of said carrier frame and extending laterally between and operatively securing together said frame members, means for selectively locking and unlocking the engaged attaching elements together and from each other, respectively, each said first attaching element being secured to the front portion of each said frame member, respectively, and each said second attaching element being adapted to be operatively secured to laterally spaced portions of said vehicle frame, one of each said first and second elements being a pin and the other being a socket receiving a respective pin, said third and fourth attaching elements being complementary engageable pin-like and socket elements, respectively, for providing support for a portion of said carrier frame on the vehicle frame, the pin-like element including a bar portion and said socket element which receives said pin-like element being elongated to receive said bar portion.

14. The attachment of claim 13 wherein said locking means includes a security lock operatively mounted on said third and fourth attaching element and manipulable to selectively lock the latter together whereby said carrier frame may be locked to said vehicle.

15. A luggage carrier attachment for use on a tandem-wheeled vehicle which includes a vehicle frame having forward and rear ends comprising a carrier frame having front and rear ends, first means including first and second slidably engageable attaching elements fixedly secured to one and adapted to be fixedly secured to the other of said front end of said carrier frame and the vehicle frame, respectively, for removably coupling said front end of said carrier frame to said vehicle frame, second means including third and fourth slidably engageable attaching elements fixedly secured to one and adapted to be fixedly secured to the other of said carrier frame and said vehicle frame, respectively, for further removably coupling said carrier frame to said vehicle frame, said carrier frame including two laterally spaced-apart frame members adapted to straddle the rear portion of said vehicle frame, said third attaching element including a rigid part of said carrier frame and extending laterally between and operatively securing together said frame members, means for selectively locking and unlocking the engaged attaching elements together and from each other, respectively, a support member having a recess therein, said support member being adapted to be fixedly secured to said vehicle frame in a position with said recess extending horizontally, and said third element including a horizontal portion having a shape slidably fitting into said recess.

\* \* \* \* \*